No. 892,237. PATENTED JUNE 30, 1908.
H. L. & H. K. FAIRALL & T. A. EWING.
CAKE TURNER.
APPLICATION FILED JULY 31, 1907.

2 SHEETS—SHEET 1.

Witnesses
J. C. Simpson
John S Powro

Inventors
Howard L. Fairall.
Harry K. Fairall.
Thomas A. Ewing
By
Attorneys

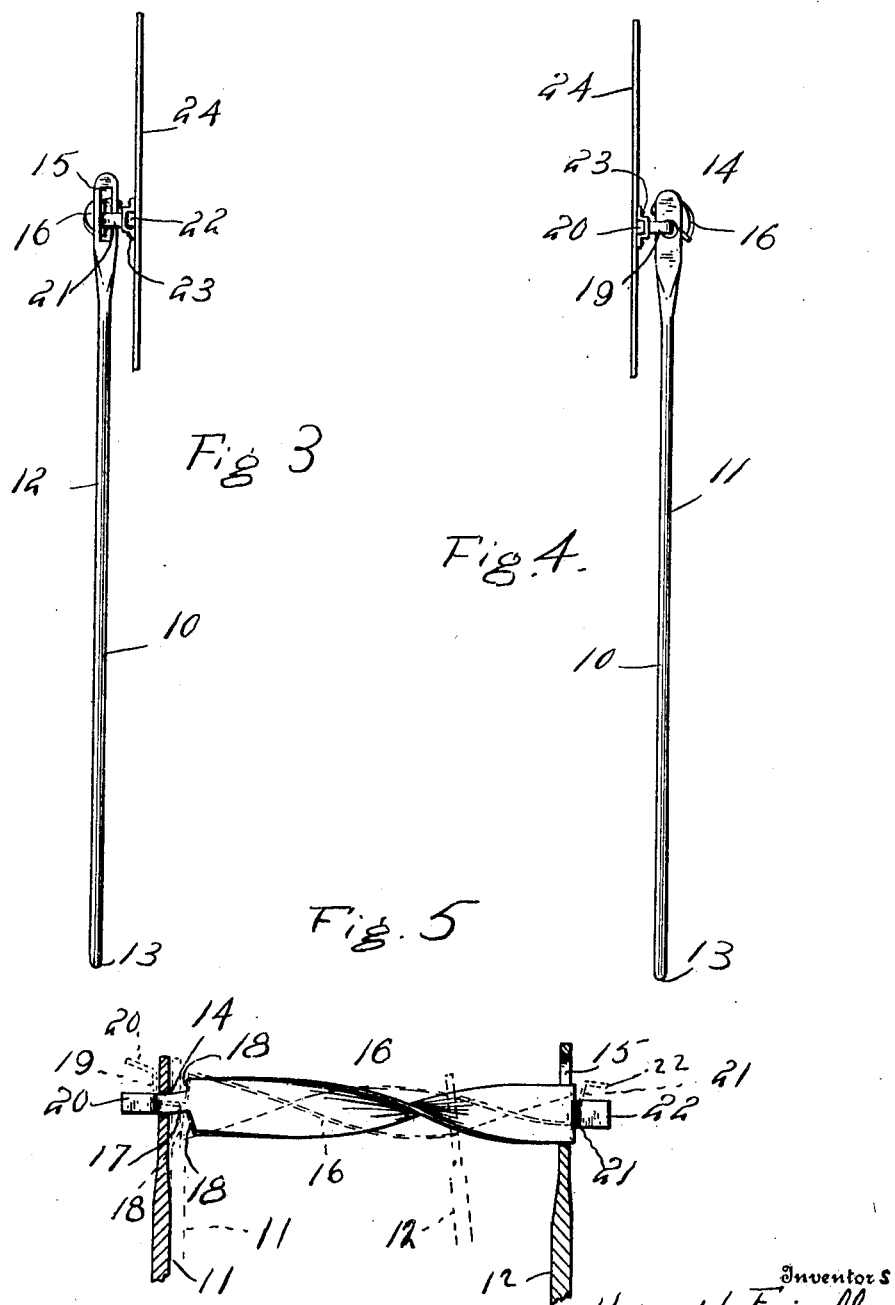

UNITED STATES PATENT OFFICE.

HOWARD L. FAIRALL, HARRY K. FAIRALL, AND THOMAS A. EWING, OF HIGHLAND, CALIFORNIA.

CAKE-TURNER.

No. 892,237. Specification of Letters Patent. Patented June 30, 1908.

Application filed July 31, 1907. Serial No. 386,373.

*To all whom it may concern:*

Be it known that we, HOWARD L. FAIRALL, HARRY K. FAIRALL, and THOMAS A. EWING, citizens of the United States, residing at Highland, in the county of San Bernardine, State of California, have invented certain new and useful Improvements in Cake-Turners; and we do hereby declare the following to be a full, clear, and exact description of the invention, such as will enable others skilled in the art to which it appertains to make and use the same.

This invention relates to new and useful improvements in cake turners, and it has particular reference to a cake turner of that type which includes a handle having resilient arms, a spiral member engaged with said arms for rotation upon movement of one of said arms and a body connected with said spiral member.

In connection with a cake turner constructed generally as above described, the invention aims as a primary object to provide such an assemblage of parts, that easy and certain operation is assured.

The invention aims as a further object to provide a cake turner which shall be simple in its structural details, inexpensive to manufacture and practical and efficient in use.

Figure 1:
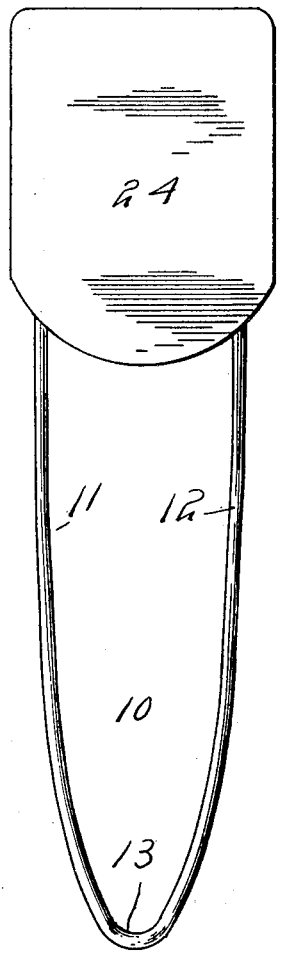
Figure 2:
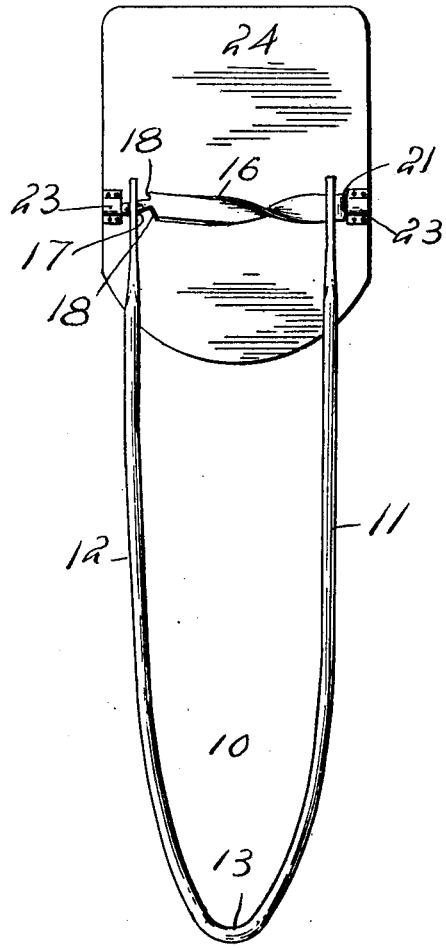

The details of construction will appear in the course of the following description in which reference is had to the accompanying drawings forming a part of this specification, like characters of reference designating similar parts, throughout the several views, wherein:

Figure 1 is a top plan view of a cake turner constructed in accordance with the present invention. Fig. 2 is a bottom plan view thereof. Fig. 3 is an elevation looking at one side of the cake turner and showing one of the resilient arms above referred to as provided with a longitudinal slot. Fig. 4 is an elevation looking at the other side of the cake turner and showing the other of the resilient arms as provided with an opening. Fig. 5 is a detailed view of a spiral member above referred to, the body being omitted and the ends of the arms being shown in section, dotted lines being employed to show the manner of rotation of this spiral member.

In the accompanying drawings, the numeral 10 designates generally a handle which includes resilient arms 11, and 12, connected at one end by a bow shaped portion 13, the arm 11 being formed at its outer end with an opening 14 and the arm 12 being formed at its corresponding end with a slot 15. In connection with the arms 11 and 12, a rotatable member 16 of spiral form is employed. The member 16 has one end reduced and extended axially as at 17. The reduced extension 17 projects through the opening 14 and defines shoulders 18 at the ends of the member 16. The material beyond the extension 17 is bent at right angles as at 19 and terminates in an angular lug 20. The member 16 has its other end reduced and extended at right angles as at 21 and terminating in an angular lug 22. The lugs 20 and 22 are secured by clips or other suitable fastening means 23 to a plate 24 upon which the cakes are scooped.

It will be understood that the opening 14 affords a bearing for the reduced extension 17 and that the arm 11 is relatively stationary, the rotation of the member 16 being effected by movement of the arm 12. In such movement of this arm, the slot 15 surrounds the member 16 and by virtue of the narrowness of this slot and the convoluted form of said member, the latter is rotated. The member 12 is moved until its end is in close proximity to the end of the member 11. It will thus be seen that a maximum degree of rotation is permitted, and that the bearing above described steadies the member 16 in such rotation.

The invention is simple in its structural details, inexpensive to manufacture and practical and efficient in use.

From the foregoing description it will be seen that simple and efficient means are provided for accomplishing the objects of the invention.

What is claimed is:

A device of the type set forth, comprising a handle including resilient portions, one having an opening at its end, and the other having a slot at its end, a spirally convoluted member having one end formed with a reduced axial extension, disposed in said opening and beyond said extension bent angularly and having its other end projected through said slot and bent angularly, and a plate having connection with said angular ends.

In testimony whereof, we affix our signatures, in presence of two witnesses.

HOWARD L. FAIRALL.
HARRY K. FAIRALL.
THOMAS A. EWING.

Witnesses:
E. M. PRICE,
S. W. NORWOOD.